United States Patent
Zhang et al.

(10) Patent No.: US 11,487,523 B2
(45) Date of Patent: Nov. 1, 2022

(54) UPDATING MACHINE EMULATOR

(71) Applicant: Alibaba Group Holding Limited, Grand Cayman (KY)

(72) Inventors: Xiantao Zhang, Hangzhou (CN); Junkang Fu, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 187 days.

(21) Appl. No.: 15/813,039

(22) Filed: Nov. 14, 2017

(65) Prior Publication Data
US 2018/0081674 A1 Mar. 22, 2018

Related U.S. Application Data

(63) Continuation of application No. PCT/CN2016/081253, filed on May 6, 2016.

(30) Foreign Application Priority Data

May 15, 2015 (CN) .......................... 201510249389.8

(51) Int. Cl.
*G06F 8/65* (2018.01)
*G06F 9/455* (2018.01)
*G06F 9/4401* (2018.01)
*G06F 8/656* (2018.01)

(52) U.S. Cl.
CPC .............. *G06F 8/65* (2013.01); *G06F 9/4418* (2013.01); *G06F 9/455* (2013.01); *G06F 8/656* (2018.02)

(58) Field of Classification Search
None
See application file for complete search history.

(56) References Cited

U.S. PATENT DOCUMENTS

| | | | |
|---|---|---|---|
| 9,292,332 B1* | 3/2016 | Liguori | G06F 8/65 |
| 2009/0172330 A1* | 7/2009 | Dewan | G06F 12/145 |
| | | | 711/163 |
| 2011/0321041 A1 | 12/2011 | Bhat et al. | |
| 2014/0089528 A1* | 3/2014 | Bloch | G06F 12/08 |
| | | | 710/4 |

(Continued)

FOREIGN PATENT DOCUMENTS

| | | |
|---|---|---|
| CN | 102436410 A | 5/2012 |
| CN | 102917055 A | 2/2013 |

(Continued)

OTHER PUBLICATIONS

Machine translation of first Chinese office action dated Nov. 29, 2018 for Chinese patent application No. 201510249389.8, a counterpart foreign application of U.S. Appl. No. 15/813,039, 11 pages.

(Continued)

*Primary Examiner* — Eric C Wai (57) ABSTRACT

A method for hot updating machine emulator including requesting specified memory which is used to store the virtual machine memory address and virtual machine status information and is not released when updating a machine emulator; restoring the virtual machine status information from the specified memory after the machine emulator is updated. Thus, the techniques of the present disclosure accelerate recovery speed and shorten updating time.

18 Claims, 6 Drawing Sheets

(56) References Cited

U.S. PATENT DOCUMENTS

| | | | | |
|---|---|---|---|---|
| 2014/0115587 | A1* | 4/2014 | Qin | H04L 41/0672 |
| | | | | 718/1 |
| 2015/0019741 | A1 | 1/2015 | DeCusatis et al. | |
| 2015/0058580 | A1* | 2/2015 | Lagar Cavilla | G06F 3/0683 |
| | | | | 711/149 |
| 2015/0370587 | A1* | 12/2015 | Kureha | G06F 9/45558 |
| | | | | 718/1 |

FOREIGN PATENT DOCUMENTS

| | | |
|---|---|---|
| CN | 102999369 | 3/2013 |
| CN | 102999369 A | 3/2013 |
| CN | 103095834 | 5/2013 |
| CN | 103095834 A | 5/2013 |
| CN | 103136030 A | 6/2013 |
| CN | 1003136030 | 6/2013 |
| CN | 103744725 A | 4/2014 |

OTHER PUBLICATIONS

Translation of International Search Report from corresponding PCT application No. PCT/CN2016/081253 dated Jul. 27, 2016, 2 pages.
Translation of Written Opinion from corresponding PCT application No. PCT/CN2016/081253 dated Jul. 27, 2016, 7 pages.

* cited by examiner

UPDATING MACHINE EMULATOR

CROSS REFERENCE TO RELATED PATENT APPLICATIONS

This application claims priority to and is a continuation of PCT Patent Application No. PCT/CN2016/081253, filed on May 6, 2016, which claims priority to Chinese Patent Application No. 201510249389.8, filed on May 15, 2015, entitled "Method and Device for Upgrading QEMU Online," which are hereby incorporated by reference in their entirety.

TECHNICAL FIELD

The present disclosure relates to the technology field of computers and, more particularly, to a technique for updating a machine emulator for a virtual machine online.

BACKGROUND

In the KVM (Kernel-based Virtual Machine) virtualization, the machine emulator (such as QEMU) is a process that runs on the host (such as Linux), and is thus equivalent to a container of the virtual machine. A host may run on one or more QEMU processes. Each virtual central processing unit (VCPU) of the virtual machine corresponds to a thread of the QEMU process. The QEMU process applies to the host for the memory used by the virtual machine. Meanwhile, QEMU is also responsible for emulation of the devices of the virtual machine (such as network cards, mouse, disks, etc.), so that QEMU is a very important component of the KVM virtualization.

In the KVM virtualization, hot update of QEMU component (i.e., online update without shutting down the virtual machine) will make fast iteration of QEMU component possible, which facilitates the introduction of new features, bug fixes and so on. However, the hot update of QEMU components is an industry problem. The industry does not yet have a QEMU hot update technology, and the closest existing solution is live migration technology. In the KVM virtualization, the live migration is a relatively mature technology, which refers to migrate a virtual machine from one physical machine to another physical machine without shutting down. To update QEMU, a virtual machine may be migrated from local host to local host, and the virtual machine at the destination host will use the updated QEMU, after completion. Thus, QEMU is updated after the live migration.

The use of live migration technology to update the QEMU component has many defects. First, this technique needs to copy the memory. The current memory copy in live migration needs two steps: (1) iteratively copy source virtual machine memory "dirty pages" (which means those memory at the source virtual machine not copied to the destination virtual machine or copied to the destination virtual machine and such copies memory is then modified by source virtual machine memory) to the destination virtual machine, until the remaining number of dirty pages is smaller than a certain value; (2) suspend the virtual machine and copy the remaining "dirty pages" to the destination virtual machine. If the virtual machine has a lot of memory pressure, and continues to generate new dirty pages, the first step may not converge and thus the hot migration time will be very long or will fail. Second, after the completion of live migration, the QEMU process identification (ID) will change, which may cause some unnecessary trouble. For example, with respect to a monitor tool for virtual machine physical CPU utilization (i.e., CPU utilization of QEMU process), after the change of the QEMU process ID, the corresponding relationship between the virtual machine name and the QEMU process ID is also changed, and thus the tool must consider such case. Third, libvirt (a mainstream virtualization function and virtual machine management software) does not support hot migration from local host to local host (although QEMU itself supports), and needs to be substantially changed to support local to local live migrate. Thus, using the conventional techniques to update QEMU components will have low success rate and cause trouble for developers, and require a long time to update, thereby affecting the user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method for updating virtual machine online, which includes: requesting specified memory that is not released when updating the machine emulator; suspending a virtual machine from running, and saving virtual machine-related information to the specified memory; updating the machine emulator and transmitting address of the specified memory as a new parameter to the machine emulator; and restoring virtual machine status information, and restoring the virtual machine for running.

The present disclosure also provides a device comprising:
one or more processors; and
one or more memories storing thereon computer-readable instructions that, when executed by the one or more processors, cause the one or more processors to perform acts comprising:
  requesting specified memory that is not released when updating a machine emulator;
  suspending a virtual machine from running; and
  saving virtual machine-related information to the specified memory.

The present disclosure also provides one or more memories storing thereon computer-readable instructions that, when executed by one or more processors, cause the one or more processors to perform acts comprising:
  requesting specified memory which is used to store virtual machine memory address and virtual machine status information and is not released when updating a machine emulator; and
  restoring the virtual machine status information from the specified memory after the machine emulator is updated.

BRIEF DESCRIPTION OF THE DRAWINGS

The features, purposes, and advantages of the present disclosure are further explained in the description of the non-restrictive example embodiments as shown in the FIGs.

The same or similar labels in the FIGs represent same or similar components.

DETAILED DESCRIPTION

In conjunction with the following FIGs of the present disclosure, the technical solutions of the present disclosure will be described. Apparently, the described example embodiments merely represent some of the example embodiments of the present disclosure and are not to be construed as limiting the present disclosure. All other example embodiments obtained by those of ordinary skill in the art based on the example embodiments of the present disclosure fall within the scope of protection of the present disclosure.

In conjunction with the following FIGs of the present disclosure, the technical solutions of the present disclosure will be described. Apparently, the described example embodiments merely represent some of the example embodiments of the present disclosure and are not to be construed as limiting the present disclosure. All other example embodiments obtained by those of ordinary skill in the art based on the example embodiments of the present disclosure fall within the scope of protection of the present disclosure.

The present disclosure provides a method for updating virtual machine online, which includes: requesting specified memory that is not released when updating the machine emulator; suspending a virtual machine from running, and saving virtual machine-related information to the specified memory; updating the machine emulator and transmitting address of the specified memory as a new parameter to the machine emulator; and restoring virtual machine status information, and restoring the virtual machine for running.

For example, the virtual machine-related information includes at least one of: the virtual machine status information, the virtual machine memory address information, and the virtual machine video memory address information.

For example, the requesting specified memory that is not released when updating the machine emulator includes:

modifying a kernel of a host to support that the specified memory is not released when updating the machine emulator; and requesting the specified memory when the machine emulator is to be updated.

For example, the method further includes, prior to suspending the virtual machine from running, writing a content of a device emulated by the machine emulator into a disk.

For example, the virtual machine status information includes current status information of all devices, emulated by the machine emulator, that need to store status.

For example, the devices that need to store status include any of the following devices or any combination of the following devices: a mouse, a keyboard, a central processing unit (CPU), a serial port, and a disk device.

For example, the updating the machine emulator includes updating an executable file and one or more existing parameters of the machine emulator, and adding a parameter of address of the specified memory. For instance, an execution module may be used to update the executable file and all existing parameters of machine emulator.

For example, the method further includes running the updated machine emulator after the machine emulator is updated.

For example, the running the updated machine emulator includes:

initializing the updated machine emulator; and requesting memory for the virtual machine based on the virtual machine memory address stored in the specified memory.

For example, the restoring the virtual machine status information includes restoring the virtual machine status information from the specified memory.

For example, the method further includes releasing the specified memory after restoring the virtual machine for running.

The present disclosure also provides a device comprising:

one or more processors; and one or more memories storing thereon computer-readable instructions that, when executed by the one or more processors, cause the one or more processors to perform acts comprising:

requesting specified memory that is not released when updating a machine emulator;

suspending a virtual machine from running; and saving virtual machine-related information to the specified memory.

For example, the acts further comprise updating the machine emulator; and transmitting address of the specified memory to the machine emulator.

For example, the acts further comprise restoring virtual machine status information.

For example, the acts further comprise restoring the virtual machine for running.

For example, the transmitting the address of the specified memory to the machine emulator includes passing the address of the specified memory as a new parameter into the machine emulator.

For example, the virtual machine-related information includes at least one of:

virtual machine status information;

virtual machine memory address information; and virtual machine video memory address information.

The present disclosure also provides one or more memories storing thereon computer-readable instructions that, when executed by one or more processors, cause the one or more processors to perform acts comprising:

requesting specified memory which is used to store virtual machine memory address and virtual machine status information and is not released when updating a machine emulator; and restoring the virtual machine status information from the specified memory after the machine emulator is updated.

For example, the acts further comprise passing address of the specified memory into the machine emulator as a new parameter.

Compared with the conventional techniques, an example embodiment of the present disclosure requests specified memory to store the virtual machine memory address and virtual machine status information, and the specified memory is not released when updating the machine emulator. After the machine emulator is updated, the virtual machine status information is directly restored from the specified memory, thereby accelerating restoration speed and shortening the update time. In addition, the address of the specified memory is used as the new parameter to be transmitted into the machine emulator, thereby implementing the online update or hot update of the machine emulator. In addition, during the updating process of the machine emulator, the execution module is used to update the executable file of the machine emulator to implement the online update of the machine emulator without changing address of the machine emulator (i.e., the ID of the process is not changed). Thus, the update time may be controlled between 100 ms and 200 ms, and the user may not even notice the update, which improves user experience.

The present disclosure provides a device for updating a virtual machine online, which includes: a first apparatus that requests specified memory that is not released when updating the machine emulator; a second apparatus that suspends a virtual machine from running, and saves virtual machine-related information to the specified memory; a third apparatus that updates the machine emulator and transmits address of the specified memory as a new parameter to the machine emulator; and a fourth apparatus that restores virtual machine status information, and restores the virtual machine for running.

For example, the virtual machine-related information includes at least one of: the virtual machine status information, the virtual machine memory address information, and the virtual machine video memory address information.

For example, the first apparatus includes: a first unit that modifies a kernel of the host to support not to release the memory when updating the machine emulator; and a second unit that requests the specified memory that is not released when the machine emulator is updated.

For example, the second apparatus includes a third unit that, prior to suspending the virtual machine from running and saving the virtual machine-related information, writes content of a device, emulated by the machine emulator, that has not been written into a disk into the disk.

For example, the virtual machine status information includes current status information of all devices, emulated by the machine emulator, that need to store status.

For example, the devices that need to store status include any of the following devices or any combination of the following devices: a mouse, a keyboard, a central processing unit (CPU), a serial port, and a disk device.

For example, the third apparatus includes a fourth unit that uses an execution module to update the executable codes and all parameters of the machine emulator, and adding the address parameter of the specified memory.

For example, the device further includes a fifth apparatus that runs the updated machine emulator after the machine emulator is updated.

For example, the fifth apparatus includes a fifth unit that initializes the updated machine emulator and uses the virtual machine memory address stored in the specified memory when requesting memory for the virtual machine.

For example, the fourth apparatus includes a sixth unit that restores the virtual machine status information from the specified memory.

For example, the device further includes a sixth apparatus that releases the specified memory after the virtual machine is restored to run.

Figure 1:
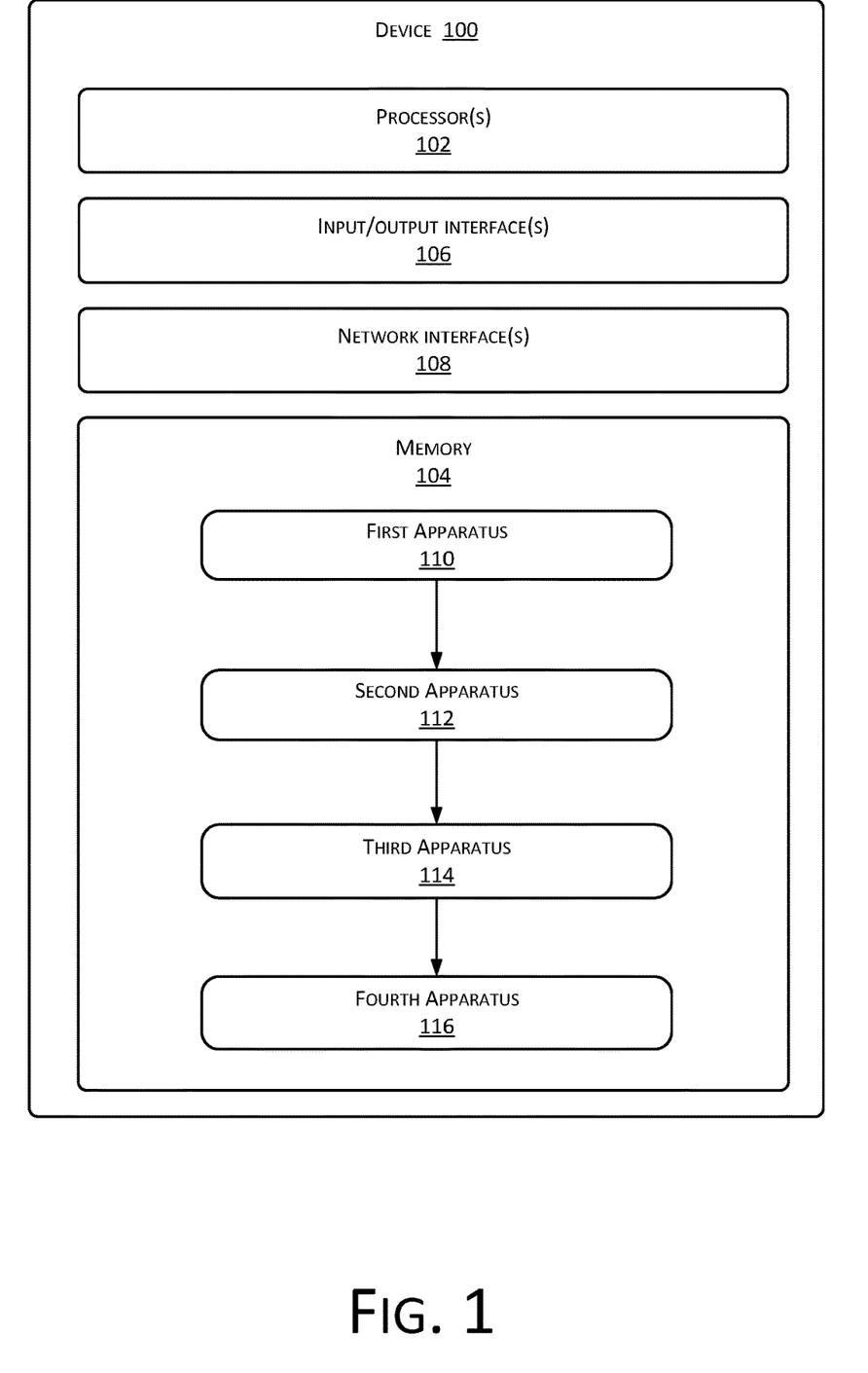
FIG. 1 illustrates a diagram of an example device for updating machine emulator online according to an example embodiment of the present disclosure.

FIG. 1 illustrates a diagram of an example device 100 for updating machine emulator online according to an example embodiment of the present disclosure. The device 100 includes one or more processor(s) 102 or data processing unit(s) and memory 104. The device 100 may further include one or more input/output interface(s) 106 and one or more network interface(s) 108. The memory 104 is an example of computer readable media. The memory 104 may store therein a plurality of modules or units including a first apparatus 110, a second apparatus 112, a third apparatus 114, and a fourth apparatus 116.

The first apparatus requests specified memory that is not released when updating the machine emulator. The second apparatus suspends a virtual machine from running, and saves virtual machine-related information to the specified memory. The third apparatus updates the machine emulator and transmits address of the specified memory as a new parameter to the machine emulator. The fourth apparatus restores virtual machine status information, and restores the virtual machine for running.

The device 100 includes, but is not limited to, user device, network device, or a device composed of user device and network device connected via network. The user device includes, but is not limited to, any mobile electronic product that enables a user to conduct human-machine interaction via user interface such as a touch pad. For example, the user device may be a smart phone, a PDA, etc. The mobile electronic product may use any operation system, such as Android operation system, IOS operation system. The network device includes an electronic device capable of automatically performing numerical calculation and information processing in accordance with pre-set or stored instructions, which includes, but is not limited to, a microprocessor, an application specific integrated circuit (ASIC), a programmable gate array (FPGA), digital processor (DSP), an embedded device. The network device includes, but is not limited to, a computer, a network host, a single network server, a plurality of network server sets, or a cloud of multiple servers. The cloud is composed of a large number of computers or network servers based on cloud computing. The cloud computing is a kind of distributed computing, which is a virtual supercomputer composed of a group of coupled computer sets. The network includes but is not limited to Internet, wide area network, metropolitan area network, local area network, VPN network, wireless ad hoc network (Ad Hoc network) and so on. For example, the device 100 may also be a script program running on the device constituted by the user device, the network device, or a combination of the user device and the network device, a combination of the network device and the touch terminal connected through the network. Certainly, those of ordinary skill in the art will appreciate that the above-described device 100 is only an example and any other existing or future device, if applicable to the present disclosure, shall be included within the protection scope of the present application and is hereby incorporated by reference.

The above devices may operate continuously. Those or ordinary skill in the art understand that "continuous" means that the above devices work in real time or are required to work in accordance with pre-set or real-time adjusted operating modes. For example, the first apparatus 110 continuously request the specified memory that is not released when updating the machine virtual machine. The second apparatus 112 continuously suspend the virtual machine operation and saves the relevant information of the virtual machine to the specified memory. The third apparatus 114 continuously updates the machine emulator and passes the address of the specified memory into the machine emulator as a new parameter. The fourth apparatus 116 continuously restores the virtual machine status information and resumes the operation of the virtual machine until the device 100 stops working.

The first apparatus 110 requests the specified memory that is not released when the machine emulator is updated.

For example, the specified memory refers to memory other than the virtual machine memory and the virtual machine video memory that is designed not to be released when the machine emulator is updated. The specified memory is used to store the virtual machine memory address and the virtual machine status information when the machine emulator is updated subsequently. The specified memory is the memory that is not released when the machine emulator is updated.

For example, a non-release mark is used to indicate the specified memory, which only needs to modify the kernel's memory request system call to add the non-release mark in the description structure of the specified memory that is assigned in response to the application with non-release mark to update the machine emulator. For example, the specified memory is identified when calling exec function and not to be released. Such modification method is simple and does not add processing pressure to devices. Certainly, those of ordinary skill in the art will appreciate that any other method that specifies memory and cause the specified memory not to be released when the machine emulator is updated, if applicable to the present disclosure, shall be included within the protection scope of the present application and is hereby incorporated by reference.

Figure 2:
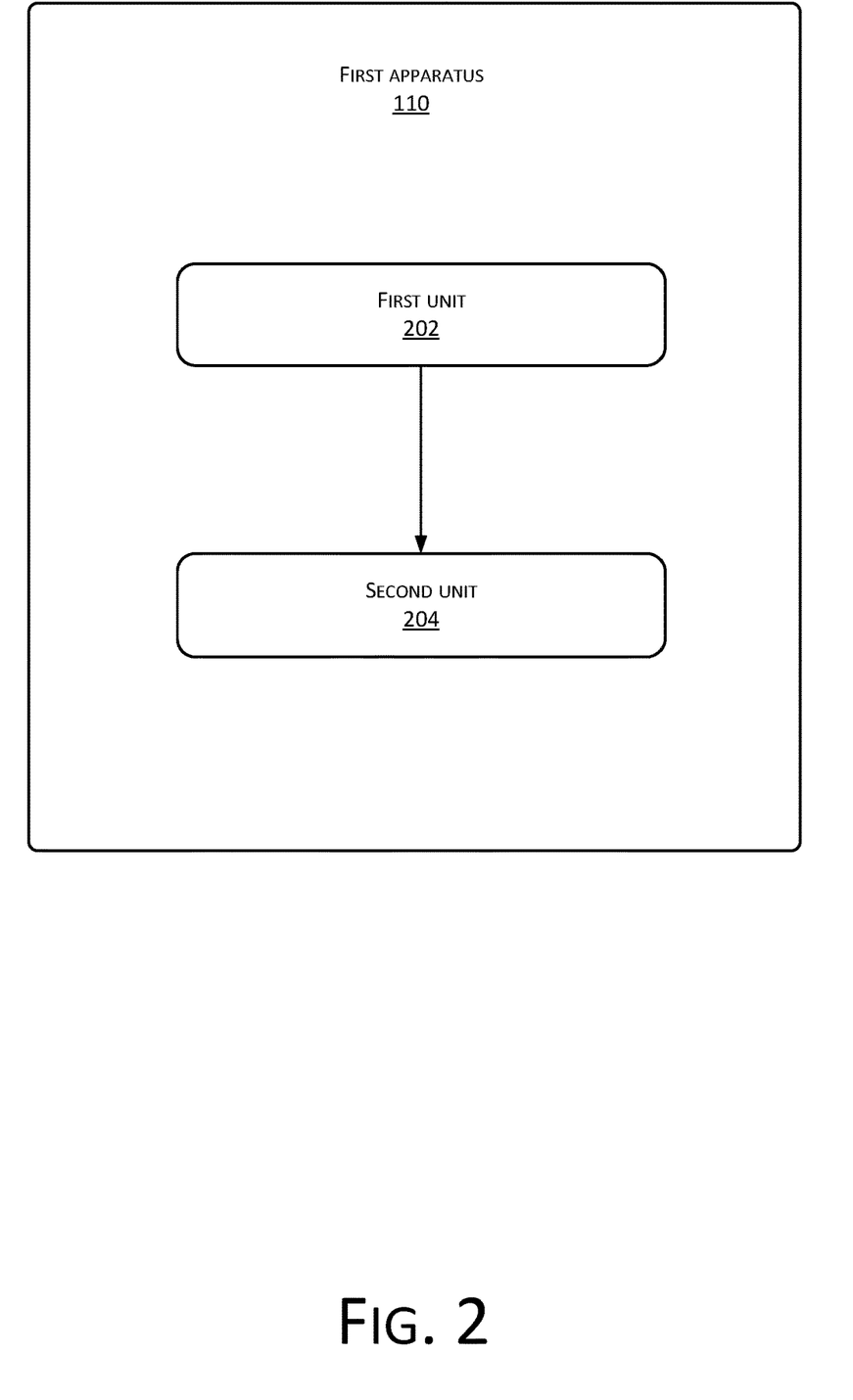
FIG. 2 illustrates a diagram of a first apparatus in the device for updating machine emulator online according to an example embodiment of the present disclosure.

For example, as shown in FIG. 2, the first apparatus 110 includes a first unit 202 and a second unit 204. The first unit modifies a kernel of the host to support not to release the memory when updating the machine emulator. The second unit requests the specified memory that is not released when the machine emulator is updated.

Thus, when the virtual machine is started, the host requests memory and video memory that are not released when the machine emulator is updated.

For the example of KVM/QEMU virtualization plan, each virtual machine corresponds to a QEMU process. The start or initialization of a QEMU process is equivalent to creating a new virtual machine. The kernel maintains a parameter of the memory applied by the QEMU process. The parameter may be called as vm_flag. It is stipulated that a flag bit of the parameter indicated whether the memory is released when the machine emulator is updated. Based on a flag indicating non-release of memory when the machine emulator is updated which is transmitted into the kernel when requesting memory such as through anonymous mmap, the kernel, when allocating memory, sets the flag bit of the vm_flags of the corresponding memory's description structure to 1.

Certainly, those of ordinary skill in the art will appreciate that the above-described machine emulator and the method for adding flag for the specified memory is only an example and any other existing or future machine emulator and method for adding flag for the specified memory, if applicable to the present disclosure, shall be included within the protection scope of the present application and is hereby incorporated by reference.

The second apparatus 112 suspends the operation of the virtual machine and stores the virtual machine-related information into the specified memory.

For example, the virtual machine-related information includes at least one of: the virtual machine status information, the virtual machine memory address information, and the virtual machine video memory address information.

The virtual machine status information is stored in the specified memory while other information is stored in the disk. Thus, the virtual machine status is quickly restored from the specified memory after the machine emulator is updated, thereby increasing speed and saving time.

For example, the virtual machine status information includes current status information of all devices, emulated by the machine emulator, that need to store status.

For example, the devices that need to store status include any of the following devices or any combination of the following devices: a mouse, a keyboard, a central processing unit (CPU), a serial port, and a disk device.

Those of ordinary skill in the art understands that the machine emulator such as QEMU may be used as emulator of personal computer to provide various peripherals devices. Through the QEMU, the standard peripheral devices include hardware VGA (Video Graphics Array) emulator, PS/2 mouse and keyboard, integrated development environment (IDE) hard disk and CD-ROM (CD-ROM) interface, and Floppy disk and other simulation. In addition, QEMU may implement simulation of the NE2000 PCI (Peripheral Controller Interconnect) network adapter, serial port, a large number of sound cards and a hub with a virtual USB (Universal Serial Bus). In addition to the simulation of standard PC or ISA (Industrial Standard Architecture) PC, QEMU may also emulate other non-PC hardware such as the Universal ARM (Advanced RISC Machine) baseline board and MIPS (Million Instructions Per Second) board. Certainly, those of ordinary skill in the art will appreciate that the above-described devices that are emulated by the machine emulator to store status are only examples and any other existing or future device that may be emulated by the machine emulator, if applicable to the present disclosure, shall be included within the protection scope of the present application and is hereby incorporated by reference.

For example, the second apparatus 112 may include a third unit (not shown in the FIGs). For example, the third unit that, prior to suspending the virtual machine from running and saving the virtual machine-related information, writes content of a device, emulated by the machine emulator, that has not been written into a disk into the disk.

For example, in the case of the QEMU process, the memory that the QEMU process requests the above devices do not carry the flag of non-release, as when the virtual machine is updated, except for the virtual machine memory, the virtual machine video memory, and the specified memory with flags, the other memory will be released. The content in the disk that is not written into the disk is timely stored. For example, the content that has not been written into the disk is written into the disk or other computer readable media to avoid that the content stored in the memory is lost after the QEMU process is updated.

Certainly, those of ordinary skill in the art will appreciate that the above-described method for writing content of a device, emulated by the machine emulator, that has not been written into a disk into the disk is only an example and any other existing or future method for writing unwritten content into the computer readable media, if applicable to the present disclosure, shall be included within the protection scope of the present application and is hereby incorporated by reference.

The third apparatus 114 updates the machine emulator and passes the address of the specified memory as the new parameter into the machine emulator.

For example, the third apparatus 114 may include a fourth unit (not shown in the FIGs). The fourth unit uses an execution module to update the executable codes and all parameters of the machine emulator, and adds the address parameter of the specified memory.

For example, the execution module may use an exec function family. The function of the exec function family is to find the executable file according to the specified file name and use it to replace content of the called process. In other words, the executable file is executed inside the called process and the exec function family is called to update the QEMU process. The parameter may be a parameter that is passed into when the QEMU process is started. The address parameter stores the memory address of the specified memory that stores the virtual machine-related information. Certainly, those of ordinary skill in the art will appreciate that the above-described execution module and parameter to update the machine emulator are only examples and any other existing or future execution module and parameter to update the machine emulator, if applicable to the present disclosure, shall be included within the protection scope of the present application and is hereby incorporated by reference.

The fourth apparatus 116 restores the virtual machine status information and restores the virtual machine to run.

In a specific implementation, from the time that the second apparatus 112 suspends the operation of the virtual machine to the time that the fourth apparatus 116 restores the virtual machine status information and restores the virtual machine to run, it will only take 100-200 ms. The time of the hot update of the virtual machine (i.e., online update without turning off the virtual machine) is short and the user even does not notice about it, which largely improves the user experience.

For example, the fourth apparatus 116 may include a sixth unit (not shown in the FIGs). For example, the sixth unit restores the virtual machine status information from the specified memory.

Figure 3:
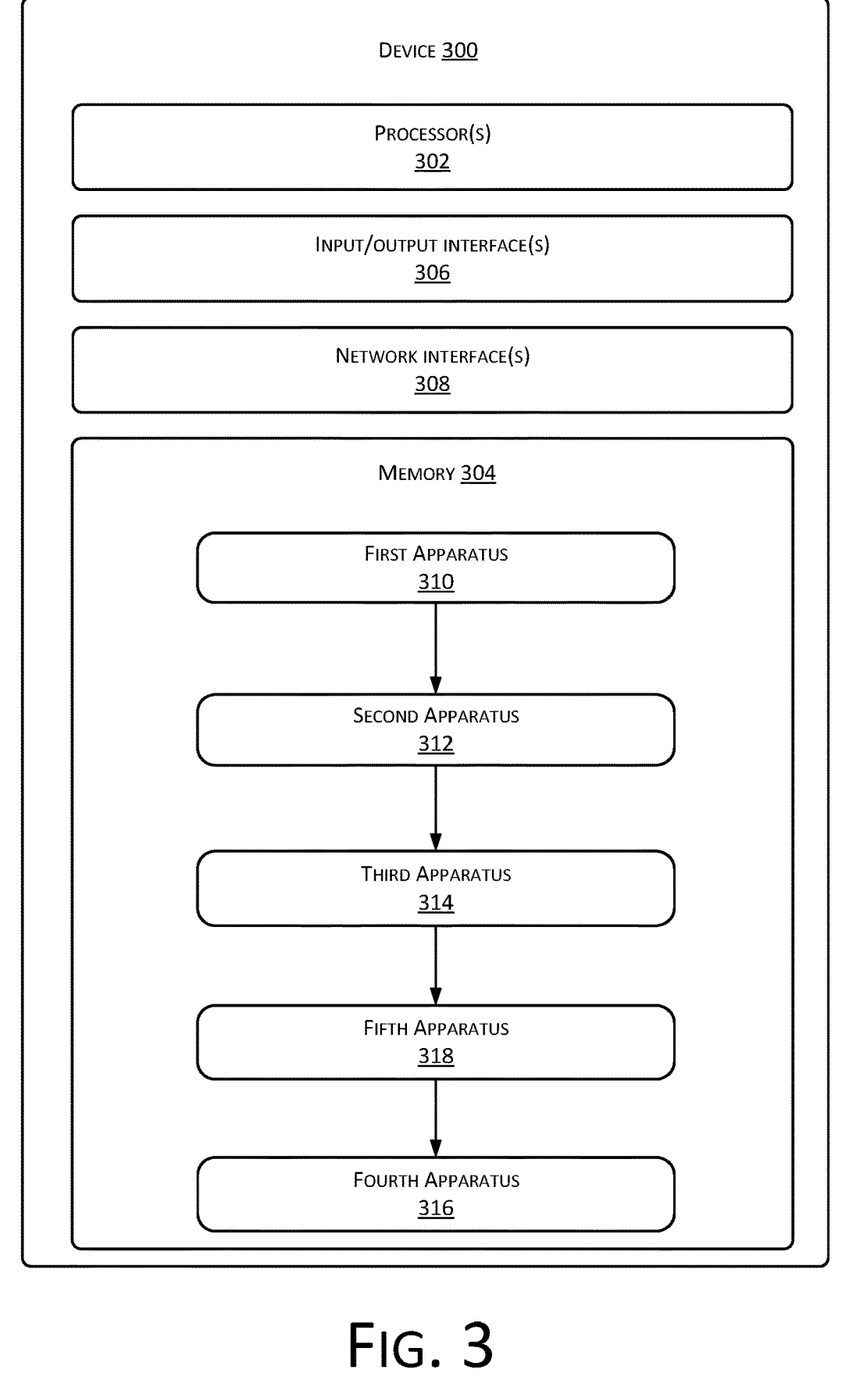
FIG. 3 illustrates a diagram of another example device for updating machine emulator online according to an example embodiment of the present disclosure.

FIG. 3 illustrates a diagram of an example device 300 for updating machine emulator online according to an example embodiment of the present disclosure. The device 300 includes one or more processor(s) 302 or data processing unit(s) and memory 304. The device 300 may further include one or more input/output interface(s) 306 and one or more network interface(s) 308. The memory 304 is an example of computer readable media. The memory 304 may store therein a plurality of modules or units including a first apparatus 310, a second apparatus 312, a third apparatus 314, and a fourth apparatus 316.

The first apparatus 310, the second apparatus 312, the third apparatus 314, and the fourth apparatus 316 in FIG. 3 are same or substantially similar to the first apparatus 110, the second apparatus 112, the third apparatus 114, and the fourth apparatus 116 in FIG. 1, which are not detailed herein for purpose of brevity.

The fifth apparatus 318 runs the updated machine emulator after the machine emulator is updated.

For example, the fifth apparatus 318 includes a fifth unit (not shown in the FIGs) that initializes the updated machine emulator and uses the virtual machine memory address stored in the specified memory when requesting memory for the virtual machine.

Following the preceding example, the exec function family is a family of functions that replace the current process image with new program file and such program file is executed from the main function. The third apparatus 310 passes all parameters of the previous QEMU process and the new parameter indicating the address of the specified memory into the new QEMU. The executable file of the new QEMU restarts from the main function and conducts various initialization operations. If the parameter includes the address of the specified memory that is passed into, when allocating memory for the virtual machine, the virtual machine memory address stored in the specified memory is used and there is no need to request memory again. The virtual machine memory is not released during the process of calling the exec function to initialize and restarting the executable file of the machine emulator after update. This is the reason that the techniques of the present disclosure realize update of machine emulator (such as QEMU) without copying memory. Compared with the conventional hot migration techniques that need to copy memory content and is easy to fail when the memory pressure is large, the techniques of the present disclosure do not require copying memory, which largely increases the successful rate of update. After the various initialization operations are completed, the virtual machine status information stored in the virtual memory is used to restore the virtual machine status. Certainly, those of ordinary skill in the art will appreciate that the above-described method for running the executable file of the updated machine emulator is only an example and any other existing or future method for running the executable file of the updated machine emulator, if applicable to the present disclosure, shall be included within the protection scope of the present application and is hereby incorporated by reference.

In addition, based on the above example embodiment, the device 300 may also include a sixth apparatus 320 (not shown in the FIGs) stored in memory 304. The sixth apparatus releases the specified memory after the virtual machine is restored to run.

After the machine emulator of the virtual machine is updated online, the specified memory that has achieved its purpose is released, thereby saving memory storage space and improving system running efficiency.

Figure 4:
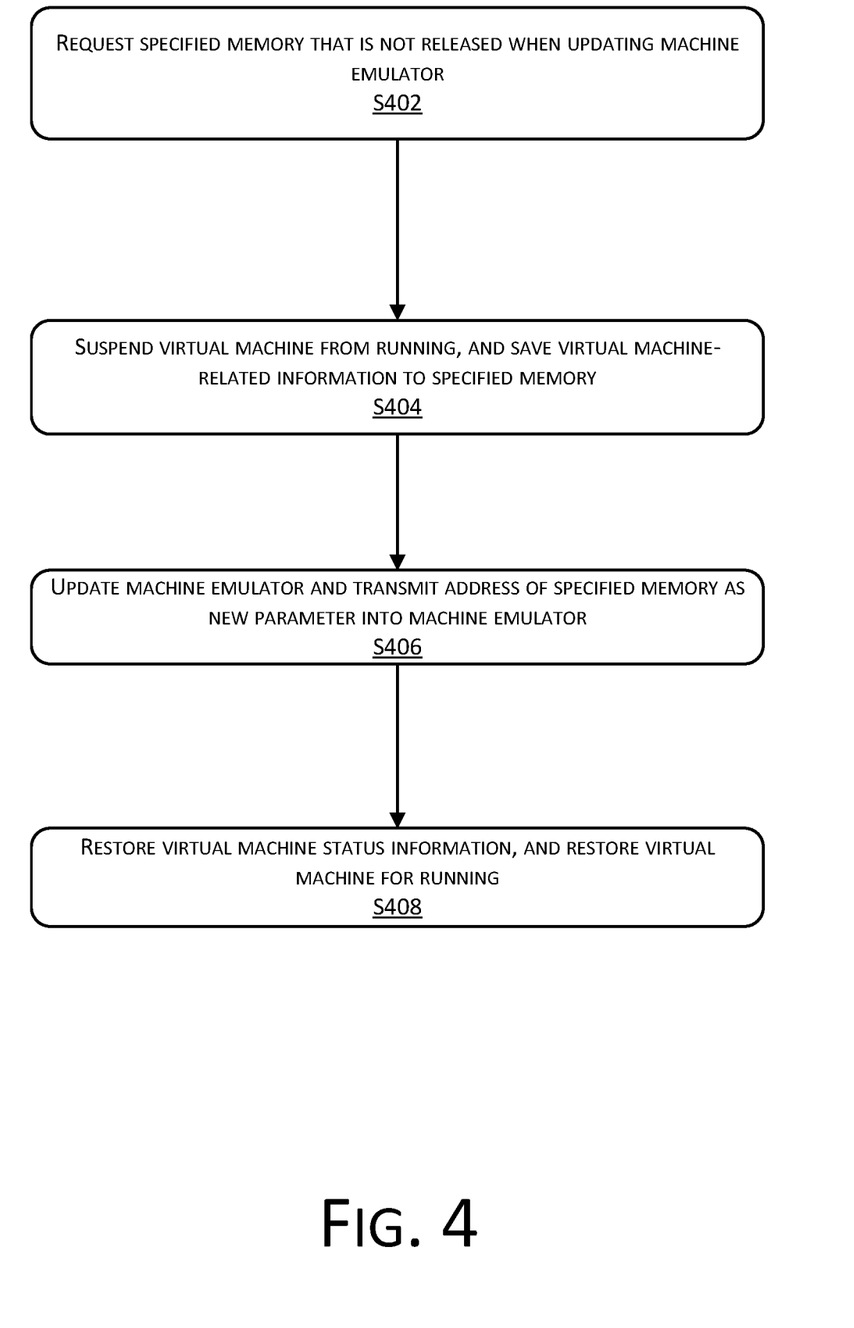
FIG. 4 illustrates a flowchart of an example method for updating machine emulator online according to an example embodiment of the present disclosure.

FIG. 4 illustrates a flowchart of an example method for updating machine emulator online according to an example embodiment of the present disclosure.

The method includes operations 402, 404, 406, and 408. At 402, a device requests specified memory that is not released when updating the machine emulator. At 404, the device suspends a virtual machine from running, and saves virtual machine-related information to the specified memory. At 406, the device updates the machine emulator and transmits address of the specified memory as a new parameter into the machine emulator. At 408, the device restores virtual machine status information, and restores the virtual machine for running.

The device includes, but is not limited to, user device, network device, or a device composed of user device and network device connected via network. The user device includes, but is not limited to, any mobile electronic product that enables a user to conduct human-machine interaction via user interface such as a touch pad. For example, the user device may be a smart phone, a PDA, etc. The mobile electronic product may use any operation system, such as Android operation system, IOS operation system. The network device includes an electronic device capable of automatically performing numerical calculation and information processing in accordance with pre-set or stored instructions, which includes, but is not limited to, a microprocessor, an application specific integrated circuit (ASIC), a programmable gate array (FPGA), digital processor (DSP), an embedded device. The network device includes, but is not limited to, a computer, a network host, a single network server, a plurality of network server sets, or a cloud of multiple servers. The cloud is composed of a large number of computers or network servers based on cloud computing. The cloud computing is a kind of distributed computing, which is a virtual supercomputer composed of a group of coupled computer sets. The network includes but is not limited to Internet, wide area network, metropolitan area network, local area network, VPN network, wireless ad hoc network (Ad Hoc network) and so on. For example, the device 100 may also be a script program running on the device constituted by the user device, the network device, or a combination of the user device and the network device, a combination of the network device and the touch terminal connected through the network. Certainly, those of ordinary skill in the art will appreciate that the above-described device 100 is only an example and any other existing or future device, if applicable to the present disclosure, shall be included within the protection scope of the present application and is hereby incorporated by reference.

The device performs the operations continuously. Those or ordinary skill in the art understand that "continuous" means that the device works in real time or are required to work in accordance with pre-set or real-time adjusted operating modes. At 402, the device continuously requests specified memory that is not released when updating the machine emulator. At 404, the device continuously suspends a virtual machine from running, and saves virtual machine-related information to the specified memory. At 406, the device continuously updates the machine emulator and transmits address of the specified memory as a new parameter into the machine emulator. At 408, the device continuously restores virtual machine status information, and restores the virtual machine for running, until the device stops working.

At 402, the device requests the specified memory that is not released when the machine emulator is updated.

For example, the specified memory refers to memory other than the virtual machine memory and the virtual machine video memory that is designed not to be released when the machine emulator is updated. The specified memory is used to store the virtual machine memory address and the virtual machine status information when the machine emulator is updated subsequently. The specified memory is the memory that is not released when the machine emulator is updated.

For example, a non-release mark is used to indicate the specified memory, which only needs to modify the kernel's memory request system call to add the non-release mark in the description structure of the specified memory that is assigned in response to the application with non-release mark to update the machine emulator. For example, the specified memory is identified when calling exec function and not to be released. Such modification method is simple and does not add processing pressure to devices. Certainly, those of ordinary skill in the art will appreciate that any other method that specifies memory and cause the specified memory not to be released when the machine emulator is updated, if applicable to the present disclosure, shall be included within the protection scope of the present application and is hereby incorporated by reference.

For example, at 402, the device modifies a kernel of the host to support not to release the memory when updating the machine emulator, and requests the specified memory that is not released when the machine emulator is to be updated.

Thus, when the virtual machine is started, the host requests memory and video memory that are not released when the machine emulator is updated.

For the example of KVM/QEMU virtualization plan, each virtual machine corresponds to a QEMU process. The start or initialization of a QEMU process is equivalent to creating a new virtual machine. The kernel maintains a parameter of the memory applied by the QEMU process. The parameter may be called as vm_flag. It is stipulated that a flag bit of the parameter indicated whether the memory is released when the machine emulator is updated. Based on a flag indicating non-release of memory when the machine emulator is updated which is transmitted into the kernel when requesting memory such as through anonymous mmap, the kernel, when allocating memory, sets the flag bit of the vm_flags of the corresponding memory's description structure to 1.

Certainly, those of ordinary skill in the art will appreciate that the above-described machine emulator and the method for adding flag for the specified memory is only an example and any other existing or future machine emulator and method for adding flag for the specified memory, if applicable to the present disclosure, shall be included within the protection scope of the present application and is hereby incorporated by reference.

At 404, the device suspends the operation of the virtual machine and stores the virtual machine-related information into the specified memory.

For example, the virtual machine-related information includes at least one of: the virtual machine status information, the virtual machine memory address information, and the virtual machine video memory address information.

The virtual machine status information is stored in the specified memory while other information is stored in the disk. Thus, the virtual machine status is quickly restored from the specified memory after the machine emulator is updated, thereby increasing speed and saving time.

For example, the virtual machine status information includes current status information of all devices, emulated by the machine emulator, that need to store status.

For example, the devices that need to store status include any of the following devices or any combination of the following devices: a mouse, a keyboard, a central processing unit (CPU), a serial port, and a disk device.

Those of ordinary skill in the art understands that the machine emulator such as QEMU may be used as emulator of personal computer to provide various peripherals devices. Through the QEMU, the standard peripheral devices include hardware VGA (Video Graphics Array) emulator, PS/2 mouse and keyboard, integrated development environment (IDE) hard disk and CD-ROM (CD-ROM) interface, and Floppy disk and other simulation. In addition, QEMU may implement simulation of the NE2000 PCI (Peripheral Controller Interconnect) network adapter, serial port, a large number of sound cards and a hub with a virtual USB (Universal Serial Bus). In addition to the simulation of standard PC or ISA (Industrial Standard Architecture) PC, QEMU may also emulate other non-PC hardware such as the Universal ARM (Advanced RISC Machine) baseline board and MIPS (Million Instructions Per Second) board. Certainly, those of ordinary skill in the art will appreciate that the above-described devices that are emulated by the machine emulator to store status are only examples and any other existing or future device that may be emulated by the machine emulator, if applicable to the present disclosure, shall be included within the protection scope of the present application and is hereby incorporated by reference.

For example, at 404, prior to suspending the virtual machine from running and saving the virtual machine-related information, the device writes content of a device, emulated by the machine emulator, that has not been written into a disk into the disk.

For example, in the case of the QEMU process, the memory that the QEMU process requests the above devices do not carry the flag of non-release, as when the virtual machine is updated, except for the virtual machine memory, the virtual machine video memory, and the specified memory with flags, the other memory will be released. The content in the disk that is not written into the disk is timely stored. For example, the content that has not been written into the disk is written into the disk or other computer readable media to avoid that the content stored in the memory is lost after the QEMU process is updated.

Certainly, those of ordinary skill in the art will appreciate that the above-described method for writing content of a device, emulated by the machine emulator, that has not been written into a disk into the disk is only an example and any other existing or future method for writing unwritten content into the computer readable media, if applicable to the present disclosure, shall be included within the protection scope of the present application and is hereby incorporated by reference.

At 406, the device updates the machine emulator and passes the address of the specified memory as the new parameter into the machine emulator.

At 406, the device uses an execution module to update the executable codes and all parameters of the machine emulator, and adds the address parameter of the specified memory.

For example, the execution module may use an exec function family. The function of the exec function family is to find the executable file according to the specified file name and use it to replace content of the called process. In other words, the executable file is executed inside the called process and the exec function family is called to update the QEMU process. The parameter may be a parameter that is passed into when the QEMU process is started. The address parameter stores the memory address of the specified memory that stores the virtual machine-related information. Certainly, those of ordinary skill in the art will appreciate that the above-described execution module and parameter to update the machine emulator are only examples and any other existing or future execution module and parameter to update the machine emulator, if applicable to the present disclosure, shall be included within the protection scope of the present application and is hereby incorporated by reference.

At 408, the device restores the virtual machine status information and restores the virtual machine to run.

In a specific implementation, from the time that the device suspends the operation of the virtual machine to the time that the device restores the virtual machine status information and restores the virtual machine to run, it will only take 100-200 ms. The time of the hot update of the virtual machine (i.e., online update without turning off the virtual machine) is short and the user even does not notice about it, which largely improves the user experience.

At 408, the device restores the virtual machine status information from the specified memory.

Figure 5:
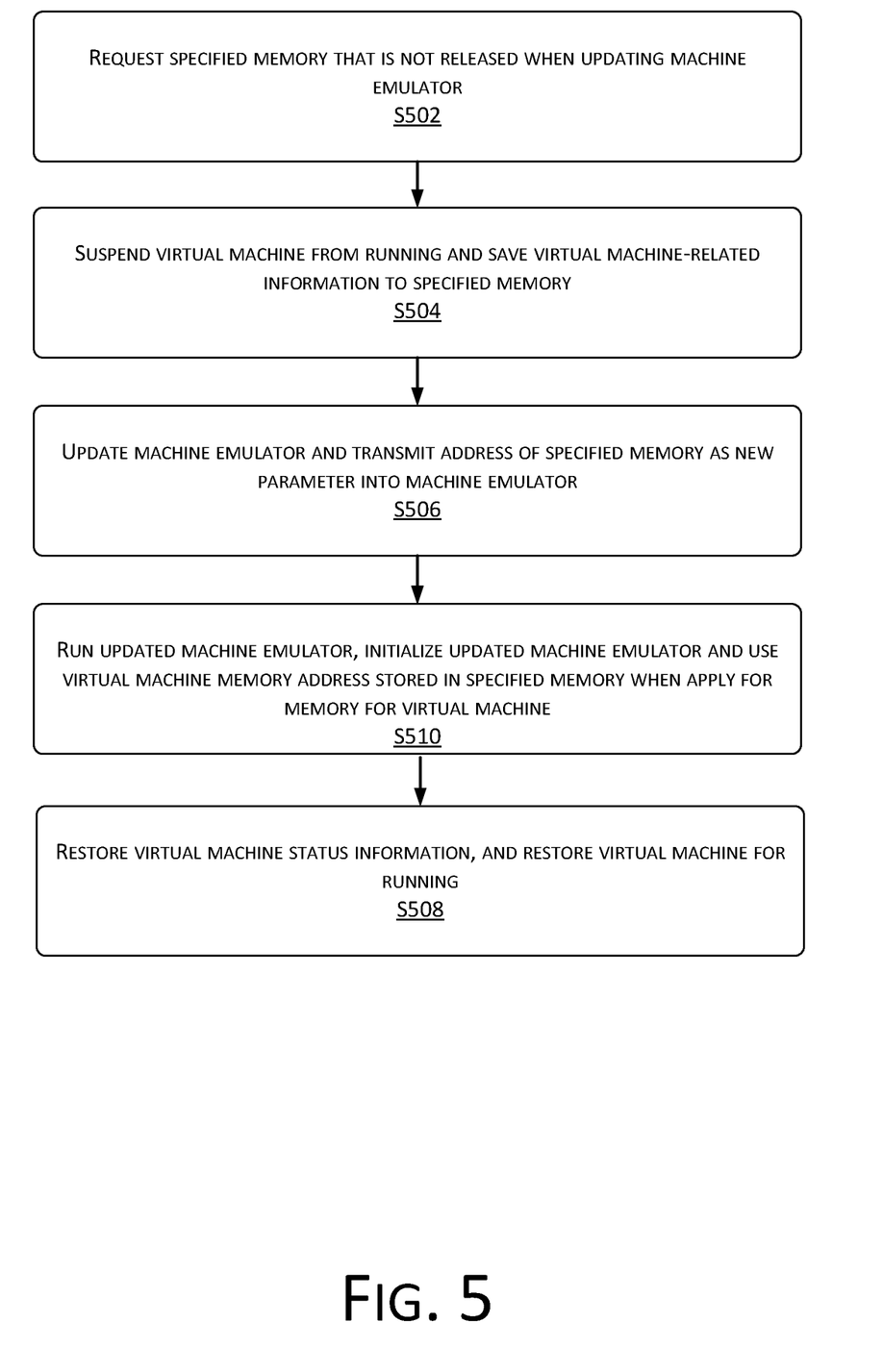
FIG. 5 illustrates a flowchart of another example method for updating machine emulator online according to an example embodiment of the present disclosure.

FIG. 5 illustrates a flowchart of another example method for updating machine emulator online according to an example embodiment of the present disclosure, The method includes operations 502, 504, 506, 510, and 508, in which the operations at 502, 504, 506, and 508 in FIG. 5 are same or substantially similar to the operations at 404, 404, 406, and 408 in FIG. 1, which are not detailed herein for purpose of brevity.

At 502, a device requests specified memory that is not released when updating the machine emulator. At 504, the device suspends a virtual machine from running, and saves virtual machine-related information to the specified memory. At 506, the device updates the machine emulator and transmits address of the specified memory as a new parameter into the machine emulator. At 508, the device restores virtual machine status information, and restores the virtual machine for running.

At 510, the device runs the updated machine emulator after the machine emulator is updated. For example, the running the updated machine emulator includes: initializing the updated machine emulator and using the virtual machine memory address stored in the specified memory when requesting memory for the virtual machine.

Following the preceding example, the exec function family is a family of functions that replace the current process image with new program file and such program file is executed from the main function. At 506, the device passes all parameters of the previous QEMU process and the new parameter indicating the address of the specified memory into the new QEMU. The executable file of the new QEMU restarts from the main function and conducts various initialization operations. If the parameter includes the address of the specified memory that is passed into, when allocating memory for the virtual machine, the virtual machine memory address stored in the specified memory is used and there is no need to request memory again. The virtual machine memory is not released during the process of calling the exec function to initialize and restarting the executable file of the machine emulator after update. This is the reason that the techniques of the present disclosure realize update of machine emulator (such as QEMU) without copying memory. Compared with the conventional hot migration techniques that need to copy memory content and is easy to fail when the memory pressure is large, the techniques of the present disclosure do not require copying memory, which largely increases the successful rate of update. After the various initialization operations are completed, the virtual machine status information stored in the virtual memory is used to restore the virtual machine status. Certainly, those of ordinary skill in the art will appreciate that the above-described method for running the executable file of the updated machine emulator is only an example and any other existing or future method for running the executable file of the updated machine emulator, if applicable to the present disclosure, shall be included within the protection scope of the present application and is hereby incorporated by reference.

For example, the method further includes releasing the specified memory after the virtual machine is restored to run.

After the machine emulator of the virtual machine is updated online, the specified memory that has achieved its purpose is released, thereby saving memory storage space and improving system running efficiency.

Figure 6:
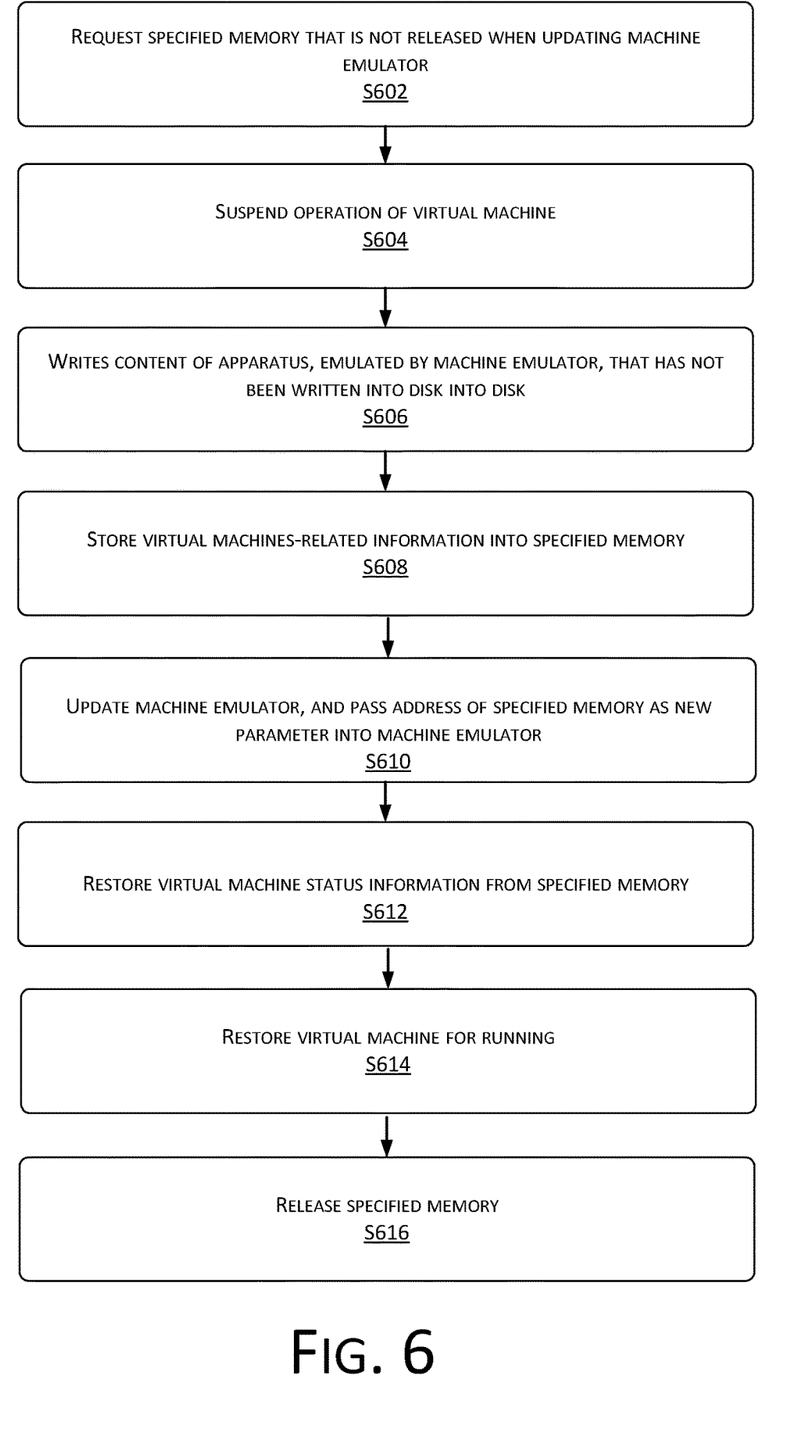
FIG. 6 illustrates a diagram of another example device for updating machine emulator according to an example embodiment of the present disclosure.

FIG. 6 illustrates a flowchart of another example method for updating machine emulator online according to an example embodiment of the present disclosure. The following process may be used to apply the techniques of the present disclosure to online update the machine emulator in KVM virtualization.

At 602, a device requests the specified memory that is not released when the machine emulator is updated. For example, the kernel of the host is modified to add a flag for the specified memory. The flag indicates that the specified memory is not released when the machine emulator is updated.

At 604, the device suspends the operation of the virtual machine.

At 606, the device writes content of an apparatus, emulated by the machine emulator, that has not been written into a disk into the disk.

At 608, the device stores the virtual machine-related information into the specified memory. For example, the virtual machine-related information includes at least one of: the virtual machine status information, the virtual machine memory address information, and the virtual machine video memory address information.

At 610, the device updates the machine emulator and passes the address of the specified memory as the new parameter into the machine emulator. For example, the device uses an execution module to update the executable codes and all parameters of the machine emulator, and adds the address parameter of the specified memory.

At 612, the device restores the virtual machine status information from the specified memory. For example, the device runs the updated machine emulator, initializes the updated machine emulator and uses the virtual machine memory address stored in the specified memory when requesting memory for the virtual machine.

At 614, the device restores the operation of the virtual machine.

At 616, the device released the specified memory applied at 602.

Compared with the conventional techniques, an example embodiment of the present disclosure requests specified memory to store the virtual machine memory address and virtual machine status information, and the specified memory is not released when updating the machine emulator. After the machine emulator is updated, the virtual machine status information is directly restored from the specified memory, thereby accelerating restoration speed and shortening the update time. In addition, the address of the specified memory is used as the new parameter to be transmitted into the machine emulator, thereby improving the successful rate of update and reducing the burden of developer.

In addition, during the updating process of the machine emulator, the execution module is used to update the executable file of the machine emulator to implement the online update of the machine emulator without changing address of the machine emulator (i.e., the process ID of the previous version of machine emulator is not changed). Thus, the user may not even notice the update, which improves user experience.

In a standard configuration of the present disclosure, the terminal, the device and trusted party in the network include one or more central processing units (CPUs), input/output interface(s), network interface(s), and memory. The memory may include non-permanent memory, random access memory (RAM) and/or nonvolatile memory, such as read-only memory (ROM) or flash memory, in computer-readable media. The memory is an example of computer readable media.

The computer readable media include non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission media, and can be used to store information accessible to the computing device. According to the definition herein, the computer readable media do not include transitory media, such as modulated data signals and carriers.

Obviously, those skilled in the art may make various modifications and variations of the present disclosure without departing from the spirit and scope of the present disclosure. Thus, if these modifications and variations of the present disclosure of the present disclosure claims and their equivalents within the scope thereof, the present disclosure is intended to cover these modifications and variations.

It should be noted that, the present disclosure may be implemented in software and/or a combination of software and hardware. For example, the present disclosure may employ Application-specific integrated circuit (ASIC), a general purpose computer or any other similar hardware implemented. In one embodiment, the software program of the present disclosure may be executed to implement the above steps or functions by one or more processors. Likewise, the software programs (including associated data structures) may be stored in a computer-readable recording medium, e.g., RAM memory, magnetic or optical drive or a floppy disk and the like. Further, some steps or functions of the present disclosure can be implemented in hardware, e.g., circuit cooperated with the processor to perform the respective steps or functions of the circuit.

Further, a portion of the present disclosure may be applied as computer program product, such as computer readable instructions which, when executed by a computer, by operating of the computer, calls a method and/or technical solutions according to the application. The computer readable instructions to call the method of the present disclosure, may be stored in fixed or removable recording medium, and/or be transmitted by data stream through data broadcast or other signal bearing medium stream, and/or stored in accordance with the working memory of a computer device running said program instructions. Here, one embodiment of the present disclosure includes a device including a memory for storing computer program instructions and a processor for executing program instructions, wherein, when the computer program instructions are executed by the processor, the device is triggered to perform the methods and/or technical solutions of the preceding various embodiments of the present disclosure.

To those of ordinary skill in the art, it is apparent that the present disclosure is not limited to the details of the above-described exemplary embodiments, but may be realized in other specific forms without departing from the spirit or essential characteristics of the present disclosure. Therefore, no matter from what point of view, the embodiments should be considered exemplary and non-restrictive. The scope of the present disclosure is defined by the appended claims rather than by the foregoing description. Thus all changes which are within the equivalent meanings and scope of the elements of the claims are covered by the present disclosure.

The labels in the claims of the present disclosure shall not be constructed as limiting the claims. In addition, apparently the term "comprising" does not exclude other elements or steps, the singular does not exclude a plurality. A plurality of units or apparatuses described in the apparatus claim may be implemented by one unit or apparatus through software or hardware. The terms first, second, etc. are used to indicate the name, and do not indicate any particular sequence.

What is claimed is:

1. A method comprising:
    requesting specified memory;
    modifying a flag maintained by a kernel of a host, the flag indicating that the specified memory is not released when updating a machine emulator;
    suspending a virtual machine from running when the flag maintained by the kernel of the host is modified;
    saving virtual machine-related information, as virtual machine status information and virtual machine memory address information, associated with the virtual machine to the specified memory;
    updating the machine emulator;
    transmitting an address of the specified memory to the machine emulator;
    running the updated machine emulator at least by requesting memory for the virtual machine based on accessing the specified memory, wherein the accessing the specified memory includes accessing the virtual machine memory address information stored in the specified memory;
    restoring the virtual machine status information included in the virtual machine-related information; and
    restoring the virtual machine for running.

2. The method of claim 1, wherein the transmitting the address of the specified memory to the machine emulator includes passing the address of the specified memory as a new parameter into the machine emulator.

3. The method of claim 1, wherein the virtual machine-related information includes:
    virtual machine video memory address information.

4. The method of claim 3, wherein the virtual machine status information includes current status information of a device emulated by the machine emulator.

5. The method of claim 4, wherein the device includes one or more of the following devices:
    a mouse;
    a keyboard;
    a central processing unit (CPU);
    a serial port; and
    a disk device.

6. The method of claim 1, further comprising:
    prior to the suspending the virtual machine from running, writing a content of a device emulated by the machine emulator into a disk.

7. The method of claim 1, wherein the updating the machine emulator includes:
    updating an executable file and one or more existing parameters of the machine emulator; and
    adding a parameter of the address of the specified memory.

8. The method of claim 7, wherein the updating the executable file and the one or more existing parameters of the machine emulator includes:
    using an execution module to update the executable file and all existing parameters of the machine emulator.

9. The method of claim 1, wherein the running the updated machine emulator includes:
    initializing the updated machine emulator.

10. The method of claim 1, wherein the restoring the virtual machine status information includes:
    restoring the virtual machine status information from the specified memory.

11. A device comprising:
    one or more processors; and
    one or more memories storing thereon computer-readable instructions that, when executed by the one or more processors, cause the one or more processors to perform acts comprising:
        requesting specified memory;
        modifying a flag maintained by a kernel of a host, the flag indicating that the specified memory is not released when updating a machine emulator;
        suspending a virtual machine from running when the flag maintained by the kernel of the host is modified;
        saving virtual machine-related information, as virtual machine status information and virtual machine memory address information, associated with the virtual machine to the specified memory;
        updating the machine emulator;
        transmitting an address of the specified memory to the machine emulator;
        running the updated machine emulator at least by requesting memory for the virtual machine based on accessing the specified memory, wherein the accessing the specified memory includes accessing the virtual machine memory address information stored in the specified memory;
        restoring the virtual machine status information included in the virtual machine-related information; and
        restoring the virtual machine for running.

12. The device of claim 11, wherein the transmitting the address of the specified memory to the machine emulator includes passing the address of the specified memory as a new parameter into the machine emulator.

13. The device of claim 11, wherein the updating the machine emulator includes:
    updating an executable file and one or more existing parameters of the machine emulator; and
    adding a parameter of the address of the specified memory.

14. The device of claim 11, wherein the virtual machine-related information includes:
    virtual machine video memory address information.

15. One or more memories storing thereon computer-readable instructions that, when executed by one or more processors, cause the one or more processors to perform acts comprising:
    requesting specified memory;
    modifying a flag maintained by a kernel of a host, the flag indicating that the specified memory is not released when updating a machine emulator;
    suspending a virtual machine from running when the flag maintained by the kernel of the host is modified;
    saving virtual machine-related information, as virtual machine status information and virtual machine memory address information, associated with the virtual machine to the specified memory;
    updating the machine emulator;
    transmitting an address of the specified memory to the machine emulator;
    running the updated machine emulator at least by requesting memory for the virtual machine based on accessing the specified memory, wherein the accessing the specified memory includes accessing the virtual machine memory address information stored in the specified memory; and restoring the virtual machine status information included in the virtual machine-related information after the machine emulator is updated.

16. The one or more memories of claim 15, wherein the acts further comprise:

prior to the restoring the virtual machine status information, passing the address of the specified memory into the machine emulator as a new parameter.

17. The one or more memories of claim 15, wherein the updating the machine emulator includes:

updating an executable file and one or more existing parameters of the machine emulator; and adding a parameter of the address of the specified memory.

18. The one or more memories of claim 15, wherein the restoring the virtual machine status information includes:

restoring the virtual machine status information from the specified memory.

* * * * *